(12) United States Patent
Tian

(10) Patent No.: US 12,519,220 B2
(45) Date of Patent: Jan. 6, 2026

(54) ELASTIC PIECE CONNECTION STRUCTURE AND ELECTRONIC DEVICE

(71) Applicant: HONOR DEVICE CO., LTD., Shenzhen (CN)

(72) Inventor: Ang Tian, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 12 days.

(21) Appl. No.: 17/911,059

(22) PCT Filed: Apr. 26, 2022

(86) PCT No.: PCT/CN2022/089238
§ 371 (c)(1),
(2) Date: Sep. 12, 2022

(87) PCT Pub. No.: WO2023/284363
PCT Pub. Date: Jan. 19, 2023

(65) Prior Publication Data
US 2024/0204395 A1    Jun. 20, 2024

(30) Foreign Application Priority Data
Jul. 13, 2021    (CN) .......................... 202121594286.2

(51) Int. Cl.
*H01Q 1/48*        (2006.01)
*H01R 4/34*        (2006.01)
(Continued)

(52) U.S. Cl.
CPC ................ *H01Q 1/48* (2013.01); *H01R 4/34* (2013.01); *H01R 4/70* (2013.01); *H04M 1/026* (2013.01)

(58) Field of Classification Search
CPC ............ H01Q 1/48; H01Q 1/12; H01Q 1/243; H01Q 1/242; H01R 4/34; H01R 4/70; H04M 1/026; Y02E 60/10
See application file for complete search history.

(56) References Cited

U.S. PATENT DOCUMENTS 5,955,217 A  *  9/1999  Van Lerberghe ...........................
                                                  H01M 10/0436
                                                        429/170
9,728,906 B2 *  8/2017  Colahan ................ H02M 7/003
(Continued)

FOREIGN PATENT DOCUMENTS

CN        105636383 A        6/2016
CN        207517922 U  *     6/2018     ............... H01Q 1/22
(Continued)

*Primary Examiner* — Nizar N Sivji
(74) *Attorney, Agent, or Firm* — Fish & Richardson P.C.

(57) ABSTRACT

An elastic piece connection structure includes a first connection end and a second connection end that are connected to each other. The first connection end includes a first contact portion, and the first contact portion elastically abuts against and is in conduction with a first conductor inside the electronic device. The second connection end is detachably connected to an insulation member inside the electronic device, and the second connection end abuts against and is in conduction with a second conductor inside the electronic device. According to the embodiments of this application, conduction between the first conductor and the second conductor in the electronic device is implemented, thereby reducing manufacturing costs of the electronic device.

18 Claims, 10 Drawing Sheets

(51) Int. Cl.
 *H01R 4/70* (2006.01)
 *H04M 1/02* (2006.01)

(56) References Cited

U.S. PATENT DOCUMENTS

| | | | |
|---|---|---|---|
| 2003/0164798 A1* | 9/2003 | Nevermann | H01Q 1/243 |
| | | | 343/702 |
| 2017/0214160 A1* | 7/2017 | Deng | H01R 13/2407 |
| 2020/0059054 A1 | 2/2020 | Hsu et al. | |
| 2022/0132238 A1* | 4/2022 | Yoon | H04R 1/025 |
| 2023/0353927 A1* | 11/2023 | Li | H04R 1/1066 |

FOREIGN PATENT DOCUMENTS

| | | | |
|---|---|---|---|
| CN | 208489350 U | | 2/2019 |
| CN | 209592366 U | | 11/2019 |
| CN | 209691992 U | | 11/2019 |
| CN | 209691993 U | | 11/2019 |
| CN | 209804912 U | | 12/2019 |
| CN | 211879615 U | | 11/2020 |
| CN | 211879701 U | * | 11/2020 |
| CN | 112702870 A | | 4/2021 |
| WO | WO-2019196524 A1 | * | 10/2019 ............ H04M 1/026 |

* cited by examiner

ELASTIC PIECE CONNECTION STRUCTURE AND ELECTRONIC DEVICE

CROSS-REFERENCE TO RELATED APPLICATIONS

This application is a National Stage of International Application No. PCT/CN2022/089238, filed Apr. 26, 2022 which claims priority to Chinese Patent Application No. 202121594286.2, filed on Jul. 13, 2021. Both of the aforementioned applications are hereby incorporated by reference in their entireties.

TECHNICAL FIELD

This application relates to the field of communication technologies, and in particular, to an elastic piece connection structure and an electronic device.

BACKGROUND

To avoid causing electromagnetic interference to an electric component in an electronic device such as a mobile phone, the electric component in the mobile phone such as an antenna needs to be in conduction with a reference ground of a middle frame in the mobile phone.

Currently, the antenna of the electronic device such as the mobile phone is usually arranged on a casing of the mobile phone. For example, flexible printed circuit FPC antennas are generally located on the head and the bottom of the middle frame, and cover four corners of the middle frame. There is a distance between the FPC antenna and a circuit board of the mobile phone to meet the radiation requirement of the antenna on the mobile phone. In the existing electronic device such as the mobile phone, the FPC antenna is usually connected to the reference ground of the middle frame in the mobile phone through an elastic piece, so that contact conduction between the FPC antenna and the reference ground of the middle frame is implemented through the elastic piece. The elastic piece is usually soldered to the middle frame of the mobile phone, and locked to the reference ground of the middle frame through a fastener such as a screw or the like.

However, the soldering the elastic piece to the middle frame of the mobile phone results in higher manufacturing costs of the mobile phone.

SUMMARY

This application provides an elastic piece connection structure and an electronic device, to reduce manufacturing costs of the electronic device.

According to a first aspect of embodiments of this application, an elastic piece connection structure is provided and is applicable to an electronic device. The elastic piece connection structure includes a first connection end and a second connection end that are connected to each other. The first connection end includes a first contact portion, and the first contact portion elastically abuts against and is in conduction with a first conductor inside the electronic device. The second connection end is detachably connected to an insulation member inside the electronic device, and the second connection end abuts against and is in conduction with a second conductor inside the electronic device.

In the embodiments of this application, the second connection end is arranged on the elastic piece connection structure, and the second connection end is connected to the first connection end. In this way, when the first connection end elastically abuts against the first conductor in the electronic device through the first contact portion on the first connection end, the first connection end may abut against and be in conduction with the second conductor inside the electronic device through the second connection end, thereby achieving conduction between the first conductor and the second conductor, and forming a signal transmission channel between the first conductor and the second conductor. In addition, compared with the existing fixing method of the elastic piece, in the embodiments of this application, through arrangement of the second connection end, on one hand, the elastic piece connection structure can be conveniently detachably connected to the insulation member, to realize fixing of the elastic piece connection structure in the electronic device, thereby reducing manufacturing costs of the electronic device. On the other hand, the first connection end can be fixed using the insulation member inside the electronic device, offering more positions suitable for mounting the elastic piece connection structure in the electronic device.

In a possible implementation, the second connection end is detachably connected to the insulation member and the second conductor through a fastener. In this way, the elastic piece connection structure is fixed in the electronic device, and abuts against and is in conduction with the first conductor and the second conductor, and there is no need to fix the elastic piece connection structure by soldering, so as to fix the elastic piece connection structure in the electronic device, and reduction in manufacturing costs of the electronic device. In addition, the second connection end can be tightly connected to the second conductor through the fastener, to enhance stability and reliability of conduction between the first conductor and the second conductor.

In a possible implementation, a through hole for the fastener to pass through is provided on the second connection end, and the fastener passes through the through hole and the insulation member to connect the second connection end and the second conductor.

In this way, through arrangement of the through hole, passing through the second connection end by the fastener can be facilitated, so as to implement the detachable connection between the second connection end and the second conductor.

In a possible implementation, the second connection end covers a partial surface of the insulation member, and abuts against and is in conduction with the second conductor. In this way, by covering, with the second connection end, the partial surface of the insulation member, abutting and conduction between the second connection end and the second conductor can be facilitated, so as to achieve the conduction between the first conductor and the second conductor.

In a possible implementation, the second connection end includes a substrate and a second contact portion. The second contact portion is located on a side of the substrate facing an edge of the electronic device. The second contact portion extends from an edge of the substrate and covers the partial surface of the insulation member, the second contact portion abuts against and is in conduction with the second conductor, and the second connection end is engaged with the insulation member through the second contact portion.

In this way, through arrangement of the second contact portion, on one hand, the second connection end may be in conduction with the second conductor, to implement conduction between the first conductor and the second conductor. On the other hand, the second connection end may be engaged with the insulation member, so that fixing between the elastic piece connection structure and the insulation member is firmer, thereby further enhancing the stability and reliability of the conduction between the first conductor and the second conductor.

In a possible implementation, a first end of the second contact portion is connected to the substrate, and a second end of the second contact portion extends from the edge of the substrate to a side of the insulation member opposite to the substrate.

In this way, an abutting area between the second contact portion and the second conductor may be increased, so that connection between the second connection end and the second conductor is more stable and reliable, so as to further enhance the stability and reliability of the conduction between the first conductor and the second conductor.

In a possible implementation, the second contact portion includes a connection segment, the connection segment is connected between the first end and the second end, and an accommodation space for accommodating the insulation member is formed between the second contact portion and the substrate.

In this way, through arrangement of the accommodation space, on one hand, the second end of the second contact portion can cover the insulation member, so as to implement engagement between the second connection end and the insulation member. On the other hand, the second end of the second contact portion is tightly connected to the second conductor through the insulation member, so as to enhance the stability and reliability of the connection between the second contact portion and the second conductor.

In a possible implementation, the second end of the second contact portion is a plate structure parallel to the substrate. In this way, through arrangement of the plate structure, not only the abutting area between the second end of the second contact portion and the second conductor can be increased, but also the insulation member can be kept at the same level, so that the first contact portion always abuts against and is in conduction with the first conductor.

In a possible implementation, the second contact portion includes an insertion segment inserted into the insulation member, the insertion segment extends from an edge of the second end, and the insertion segment is inserted on the insulation member.

In this way, through arrangement of the insertion segment, a fixing effect of the second connection end on the insulation member can be strengthened, so as to implement firm connection between the elastic piece connection structure and the insulation member, thereby further enhancing the stability and reliability of the conduction between the first conductor and the second conductor.

In a possible implementation, an engaging portion is further arranged on the edge of the substrate, and the engaging portion is engaged with an edge of the insulation member. In this way, through arrangement of the engaging portion, on one hand, relative movement between the insulation member and the second connection end can be further avoided, to facilitate further connection and fixing between the second connection end and the insulation member, and ensure the stability and reliability of the conduction between the first conductor and the second conductor.

In a possible implementation, at least two engaging portions are further arranged on the edge of the substrate, and the engaging portions are located on a peripheral side of the substrate. In this way, movement of the second connection end relative to the insulation member can be further limited through the engaging portion, to avoid movement of the second connection end relative to the insulation member.

In a possible implementation, the engaging portions are distributed on two sides of the second contact portion. In this way, arrangement of the elastic piece connection structure on the insulation member can be facilitated while ensuring engagement of the engaging portion with the insulation member.

In a possible implementation, the engaging portion is a folded edge on the edge of the substrate that is bent toward the insulation member. In this way, through arrangement of the folded edge, engagement between the second connection end and the insulation member can be facilitated.

In a possible implementation, the elastic piece connection structure further includes a connection portion, and the first connection end is connected to the second connection end through the connection portion. In this way, through arrangement of the connection portion, a position of the first contact portion on the elastic piece connection structure can be adjusted, so that a positional degree of freedom of the first contact portion on the elastic piece connection structure is higher.

In a possible implementation, the first contact portion is an elastic arm or an elastic protrusion. In this way, it is ensured that the first contact portion abuts against and is in conduction with the first conductor, and a structure of the first contact portion can be more diversified.

In a possible implementation, two limiting portions arranged opposite to each other are further arranged on the first connection end, and the first contact portion is located between the two limiting portions. In this way, the first contact portion can be limited by the limiting portions, to avoid excessive positional deviation occurring when the first contact portion moves relative to the first connection end under an external force.

According to a second aspect of the embodiments of this application, an electronic device is provided. The electronic device includes a casing, a first conductor, and a second conductor. An insulation member and the foregoing elastic piece connection structure are arranged in the casing, the elastic piece connection structure is detachably connected to the second conductor through the insulation member, at least one of the first conductor and the second conductor is arranged on the casing, and the first conductor abuts against and is in conduction with the second conductor through the elastic piece connection structure.

In the embodiments of this application, the elastic piece connection structure is detachably connected to the second conductor through the insulation member. In this way, conduction between the first conductor and the second conductor is implemented in the elastic piece connection structure, to improve the anti-electromagnetic interference capability of the electronic device, and the insulation member can be used as a fixing structure of the elastic piece connection structure, to fix the elastic piece connection structure inside the electronic device without soldering the elastic piece connection structure to the casing, so that not only the elastic piece connection structure can be fixed and manufacturing costs of the electronic device can be reduced, but also more positions suitable for mounting the elastic piece connection structure in the electronic device are offered.

In a possible implementation, an assembling groove is arranged on the insulation member, and the elastic piece connection structure is arranged in the assembling groove. In this way, through arrangement of the assembling groove, assembly of the elastic piece connection structure is implemented. In addition, a positional degree of freedom of the first contact portion on the elastic piece connection structure is higher, and an overall thickness of the electronic device is not affected.

In a possible implementation, the first conductor is one of a flexible printed circuit antenna and a backlight bracket of a display screen, and/or the second conductor is a reference ground on a middle frame of the casing.

In this way, the flexible printed circuit antenna or the backlight bracket can abut against and be in conduction with the reference ground through the elastic piece connection structure, thereby forming a signal transmission channel between the flexible printed circuit antenna or the backlight bracket and the reference ground.

In a possible implementation, the insulation member is a speaker box in the casing or an insulation bracket in the casing. In this way, the speaker box or the insulation bracket can be used to implement fixing of the elastic piece connection structure, to further reduce the manufacturing costs of the electronic device.

DESCRIPTIONS OF REFERENCE NUMERALS

Figure 1A:
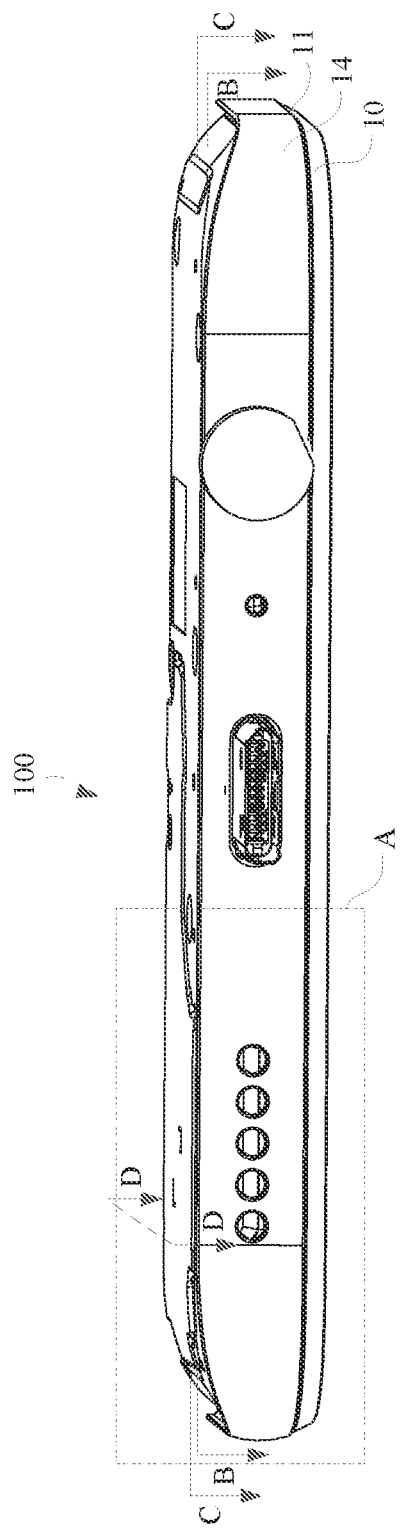
FIG. 1a is a schematic structural diagram of a bottom wall end of a mobile phone according to an embodiment of this application.

100—Mobile phone; 10—Casing; 11—Middle frame; 111—Side frame; 12—Fixing member; 121—Groove; 13—First conductor; 14—Second conductor;
20—Insulation member; 21—Assembling groove; 22—Slot; 23—Assembling platform; 24—Outer side wall;
30—Elastic piece connection structure; 31—First connection end; 311—First contact portion; 3111—Limiting block; 3112—Elastic contact; 312—Connection base; 313—Limiting portion; 3131—Groove body;
32—Second connection end; 321—Substrate; 322—Second contact portion; 3221—First end; 3222—Second end; 3223—Insertion segment; 3224—Connection segment; 323—Engaging portion; 324—Through hole; 325—Limiting bump; 326—Accommodation space;
33—Connection portion; 331—Engaging block;
40—Fastener.

DESCRIPTION OF EMBODIMENTS

Currently, in an electronic device such as a mobile phone, it is usually necessary to conduct an antenna or the like in the mobile phone with a reference ground of a middle frame in the mobile phone, so that the reference ground of the middle frame becomes a zero potential point of the antenna or the like, and a signal transmission channel is formed between the antenna and the reference ground of the middle frame, to prevent the reference ground of the middle frame from affecting performance of the antenna, thereby improving the anti-electromagnetic interference capability of the mobile phone. The reference ground of the middle frame may be understood as a metal support plate in a middle region of the middle frame in the mobile phone.

The antenna in the existing electronic device such as the mobile phone is usually arranged on a casing of the mobile phone. Using FPC antennas as an example, FPC antennas are usually arranged on the head and the bottom of the middle frame of the casing, and cover four corners of the middle frame. To implement connection and conduction between the FPC antenna and the reference ground of the middle frame in the mobile phone, an elastic piece is usually arranged between the FPC antenna and the reference ground of the middle frame in the mobile phone. Because the elastic piece is usually made of a conductive material such as metal, when an end of the elastic piece abuts against the FPC antenna and an other end abuts against the reference ground of the middle frame, the FPC antenna and the reference ground of the middle frame can be connected and conducted.

To implement fixing of the elastic piece in the mobile phone, in the existing common practice, the elastic piece is fixed on the middle frame of the mobile phone by soldering. Then, a through hole is formed in each of the elastic piece, the middle frame, and the reference ground of the middle frame. By inserting screws or the like in the through holes, and connecting the elastic piece, the middle frame, and the reference ground, the elastic piece is locked to the reference ground of the middle frame through the screws. In this way, not only the elastic piece is fixed, but also the FPC antenna and the reference ground of the middle frame can be stably connected and conducted.

However, to ensure effectiveness and reliability of connection between the FPC antenna and the reference ground of the middle frame, there are high requirements for a soldering process and a soldering effect. In this way, due to limitations of the soldering process and the soldering effect, it costs much to solder the elastic piece to the middle frame, resulting in high manufacturing costs of the mobile phone. In addition, due to continuous development of the electronic devices toward a high screen-to-body ratio, light weight, and thin structure, a structure of the middle frame is continuously compressed, and a space for soldering the elastic piece and forming holes on the middle frame is relatively limited. Therefore, mounting of the elastic piece on the middle frame is restricted to a certain extent, and a degree of freedom of a position where the elastic piece can be mounted on the middle frame is limited.

In view of this, the embodiments of this application provide an elastic piece connection structure and an electronic device. A second connection end is arranged on the elastic piece connection structure, and the second connection end is connected to and is in conduction with a first connection end of the elastic piece connection structure. In this way, when the first connection end abuts against the first conductor in the electronic device through a first contact portion on the first connection end, the first connection end can abut against and be in conduction with a second conductor in the electronic device through the second connection end, thereby achieving conduction between the first conductor and the second conductor. In addition, compared with the existing fixing method of the elastic piece soldering, in the embodiments of this application, through arrangement of the second connection end, the elastic piece connection structure can be conveniently detachably connected to the insulation member, to realize fixing of the elastic piece connection structure in the electronic device, thereby reducing manufacturing costs of the electronic device. In addition, the second connection end and the elastic piece connection structure can be fixed using an insulation member inside the electronic device, offering more positions suitable for mounting the elastic piece connection structure in the electronic device, to reliably ground first conductors of different structures in the electronic device.

In this embodiment, the electronic devices may include but are not limited to any device requiring grounding or electrical connection such as a mobile phone, a tablet computer, a notebook computer, an ultra-mobile personal computer (ultra-mobile personal computer, UMPC), a handheld computer, a walkie-talkie, a netbook, a POS machine, a personal digital assistant (personal digital assistant, PDA), a wearable device (such as a watch or a wristband), a virtual reality device, a television, or the like.

The electronic device in the embodiments of this application is described below by using the mobile phone as an example.

EMBODIMENTS

Figure 1B:
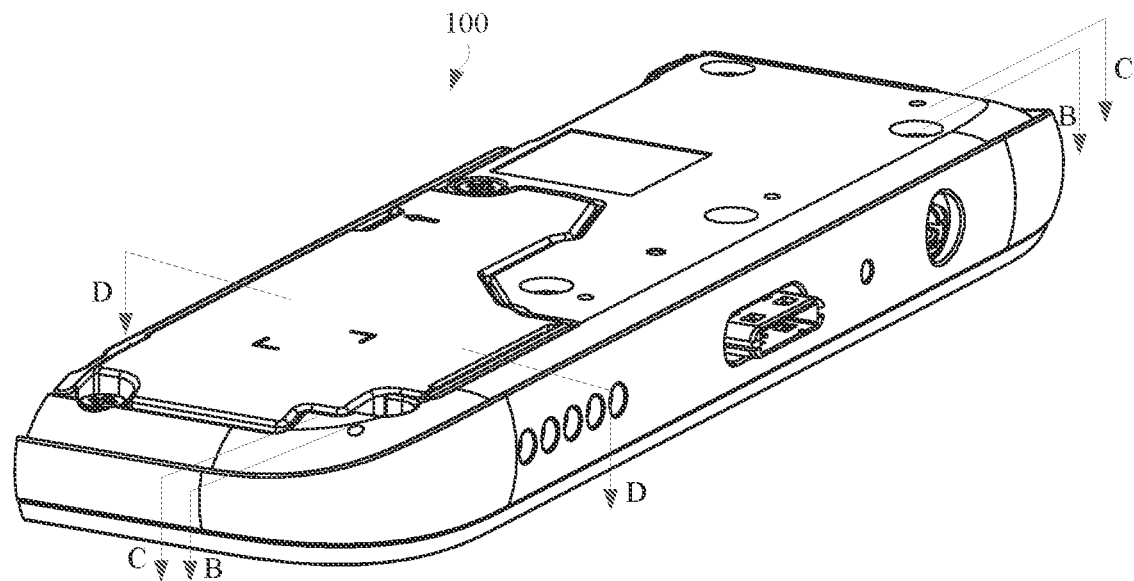
FIG. 1b is a schematic structural diagram of a bottom wall end of a mobile phone according to an embodiment of this application.
Figure 2:
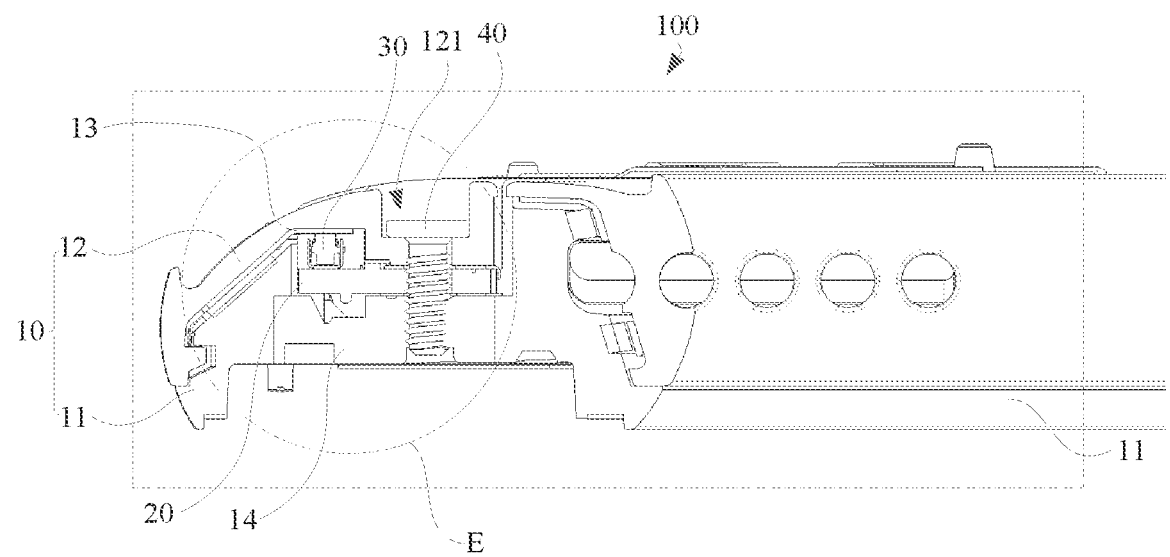
FIG. 2 is a schematic structural diagram of a part A of the mobile phone in FIG. 1a after being jointly cut from a B-B direction and a D-D direction.
Figure 3:
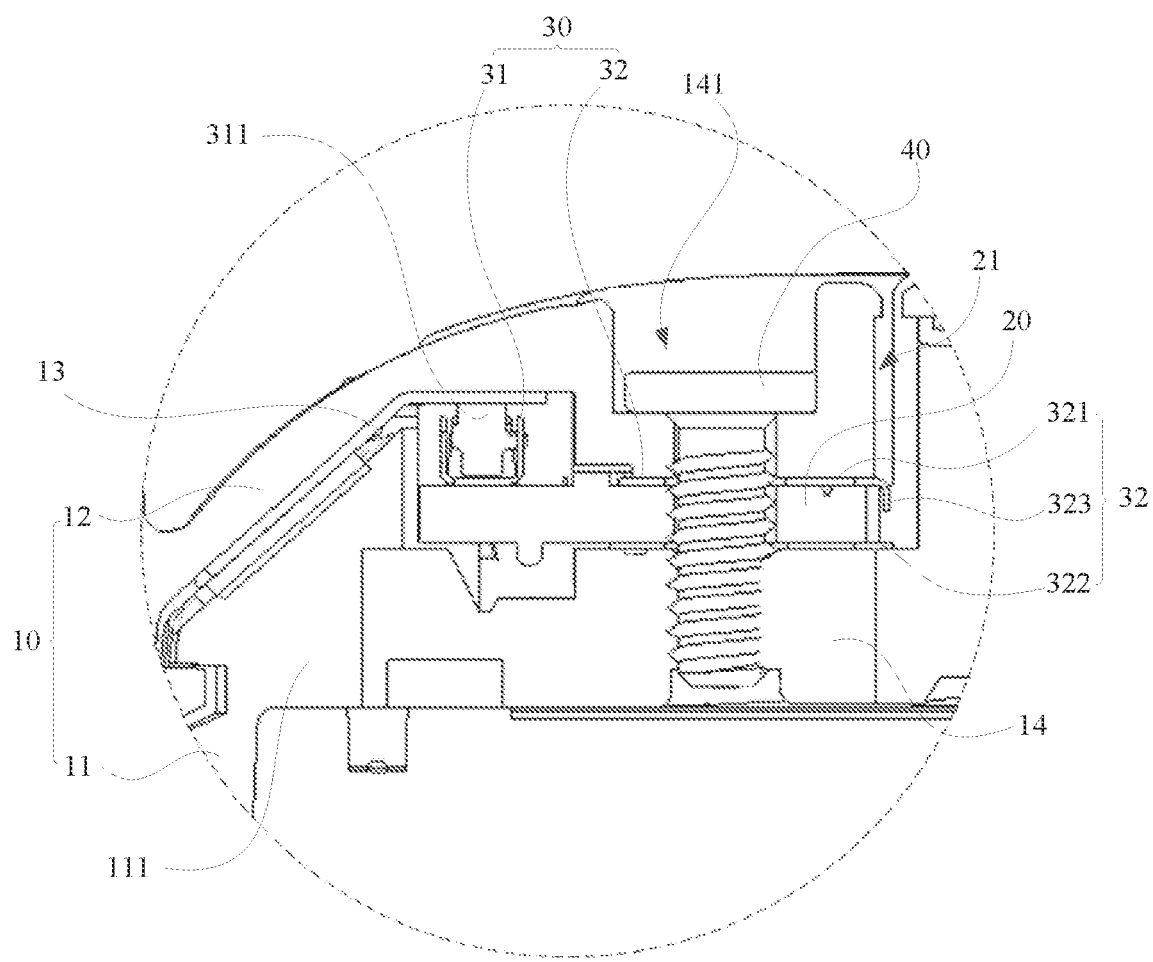
FIG. 3 is an enlarged schematic diagram of a part E of the mobile phone in FIG. 2.
Figure 4:
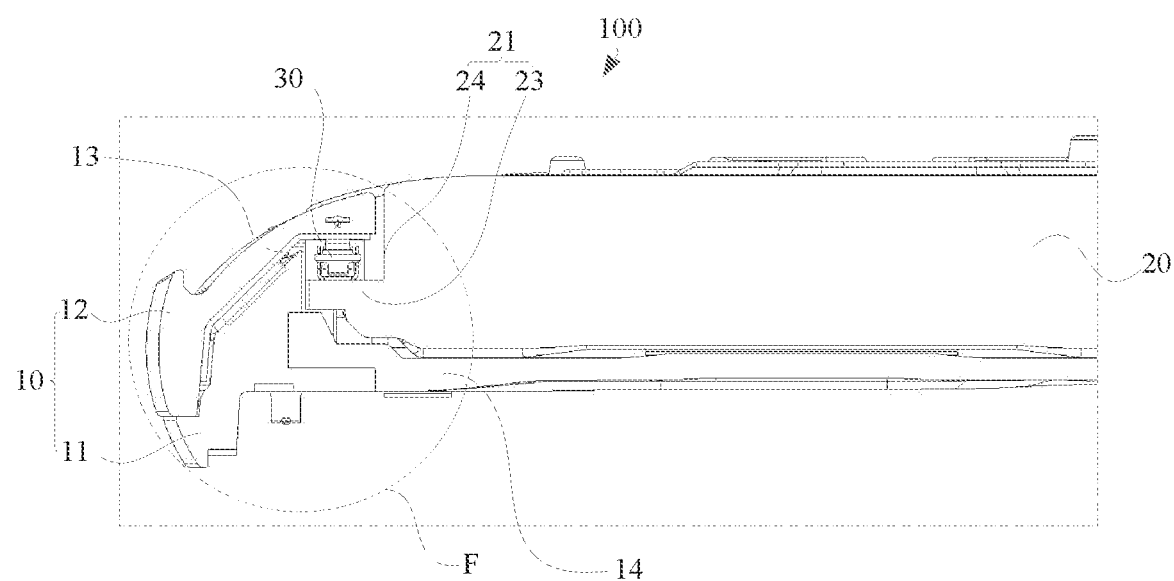
FIG. 4 is a schematic structural diagram of a part A of the mobile phone in FIG. 1a after being jointly cut from a C-C direction and a D-D direction.
Figure 5:
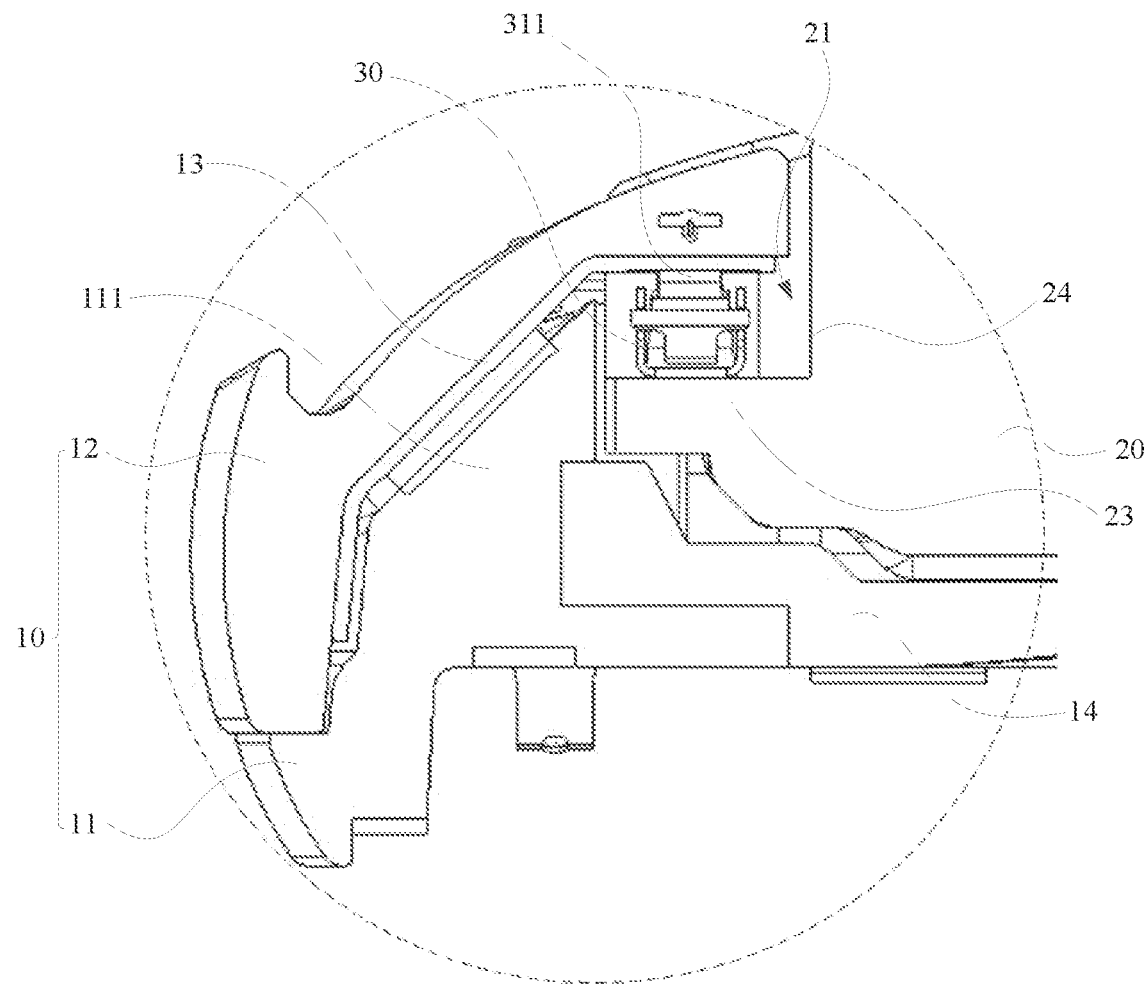
FIG. 5 is an enlarged schematic diagram of a part F of the mobile phone in FIG. 4.

FIG. 1a is a schematic structural diagram of a bottom wall end of a mobile phone according to an embodiment of this application. FIG. 1b is a schematic structural diagram of a bottom wall end of a mobile phone according to an embodiment of this application. FIG. 2 is a schematic structural diagram of a part A of the mobile phone in FIG. 1a after being jointly cut from a B-B direction and a D-D direction. FIG. 3 is an enlarged schematic diagram of a part E of the mobile phone in FIG. 2. FIG. 4 is a schematic structural diagram of a part A of the mobile phone in FIG. 1a after being jointly cut from a C-C direction and a D-D direction. FIG. 5 is an enlarged schematic diagram of a part F of the mobile phone in FIG. 4. The bottom wall end may be understood as an end of the mobile phone in contact with a workbench when the mobile phone is placed perpendicular to the workbench. It should be understood that FIG. 1b shows a different cutting direction in FIG. 1a from another perspective, so as to better understand a different cutting position in FIG. 1a.

FIG. 2 to FIG. 5 respectively show schematic structural diagrams of a mobile phone after being cut at different positions along a length direction of the mobile phone based on FIG. 1a. As can be seen from FIG. 2 and FIG. 3, the electronic device such as a mobile phone 100 may include a casing 10, a first conductor 13, and a second conductor 14. An insulation member 20 and an elastic piece connection structure 30 as mentioned above are arranged in the casing 10. At least one of the first conductor 13 and the second conductor 14 is arranged on the casing 10. The elastic piece connection structure 30 is detachably connected to the second conductor 14 through the insulation member 20, and the first conductor 13 abuts against and is in conduction with the second conductor 14 through the elastic piece connection structure 30. In this way, the elastic piece connection structure 30 may ensure that the first conductor 13 is in conduction with the second conductor 14, and a signal transmission channel is formed between the first conductor 13 and the second conductor 14, so as to improve the anti-electromagnetic interference capability of the electronic device.

In addition, because the elastic piece connection structure 30 can be detachably connected to the second conductor 14 through the insulation member 20, the insulation member 20 can be used as a fixing structure of the elastic piece connection structure 30, to fix the elastic piece connection structure 30 inside the electronic device such as the mobile phone 100. In the embodiments of this application, there is no need to solder the elastic piece connection structure 30 to the casing 10. Compared with a method of soldering the elastic piece on the middle frame 11, a fixing method of the elastic piece connection structure 30 can be simplified, fixing costs of the elastic piece connection structure 30 is reduced, and manufacturing costs of the electronic device is further reduced. In addition, more positions suitable for mounting the elastic piece connection structure 30 in the electronic device are offered.

It should be noted that, the detachable connection can be understood as that the elastic piece connection structure 30 can be disconnected after being connected to the second conductor 14 through the insulation member 20, which can facilitate disassembly of the elastic piece connection structure 30. Exemplarily, the elastic piece connection structure 30 can be connected to at least one of the insulation member 20 and the second conductor 14 through a fastener or in an engagement manner.

To facilitate mounting of the elastic piece connection structure 30, as shown in FIG. 2 and FIG. 3, an assembling groove 21 is arranged on the insulation member 20, and the elastic piece connection structure 30 is arranged in the assembling groove 21. In this way, by arranging the assembling groove 21 on the insulation member 20, on one hand, assembly of the elastic piece connection structure 30 on the insulation member 20 may be implemented, so as to be detachably connected to the second conductor 14 through the insulation member 20. On the other hand, the elastic piece connection structure 30 may be embedded in the assembling groove 21, to avoid affecting an overall thickness of the electronic device due to arrangement of the elastic piece connection structure 30 on the insulation member 20.

As shown in FIG. 2 and FIG. 3, the assembling groove 21 may be arranged at a corner portion of the insulation member 20. In this way, it is convenient for the elastic piece connection structure 30 to be connected to the insulation member 20 and to abut against and be in conduction with the second conductor 14. In addition, adverse impact on arrangement of a speaker in a speaker box due to arrangement of the assembling groove 21 can be avoided.

When the insulation member 20 is a non-circular structure, such as a square structure, the corner portions can be understood as positions of four corners of the square structure.

Referring to FIG. 2 to FIG. 3, the insulation member 20 may be a speaker box or another insulation casing in the mobile phone 100. In this way, the existing structure in the mobile phone 100 can be used to implement fixing of the elastic piece connection structure 30. In addition, on one hand, there is no need to add an additional fixing structure of the elastic piece connection structure 30 in the electronic device, such as a switching circuit board, which further reduces manufacturing costs of the electronic device. On the other hand, because the elastic piece connection structure 30 is assembled in the assembling groove 21 at the corner portion of the speaker box, normal use of the speaker is ensured, and spatial layout in the electronic device is not affected.

It can be understood that, the speaker box is an insulation casing made of an insulating material such as plastic. It should be noted that, as shown in FIG. 4 and FIG. 5, the assembling groove 21 may be jointly formed by an assembling platform 23 at the corner portion of the speaker box and an outer side wall 24 of the speaker box. That is, the assembling groove 21 may be formed on an outer surface of the speaker box.

Alternatively, in this embodiment, the insulation member 20 may be an insulation bracket in the casing 10, and the assembling groove 21 may be formed at a corner portion of the insulation bracket. That is, the insulation member 20 includes, but is not limited to, the speaker box in the mobile phone 100. In this embodiment, a structure of the insulation member 20 is not further limited.

It should be noted that, the assembling groove 21 may correspond to the first conductor 13 and the second conductor 14, so that when the elastic piece connection structure 30 is arranged in the assembling groove 21, it is convenient for the first conductor 13 to be in conduction with the second conductor 14 through the elastic piece connection structure 30.

Specifically, the first conductor 13 may be a structural metal bracket in the mobile phone 100, such as a backlight bracket of a display screen, a flexible printed circuit antenna as shown in FIG. 4 and FIG. 5, various types of flexible sensor boards, or other conductor structures requiring grounding in the electronic device. That is, the first conductor 13 includes but is not limited to the flexible printed circuit antenna or the backlight bracket of the display screen. In this embodiment, the first conductor 13 may be one of the flexible printed circuit antenna and the backlight bracket of the display screen. In this way, the flexible printed circuit antenna or the backlight bracket may be grounded through the elastic piece connection structure 30, so as to improve the anti-electromagnetic interference capability of the electronic device.

Correspondingly, the second conductor 14 may be a reference ground on the middle frame 11 of the casing 10 as shown in FIG. 4 and FIG. 5. Alternatively, the second conductor 14 may be another metal plate that may serve as a zero potential point of the first conductor 13 in the electronic device such as the mobile phone 100. That is, in this embodiment, the second conductor 14 includes but is not limited to the reference ground on the middle frame 11. In this way, the flexible printed circuit antenna or the backlight bracket can be in conduction with the reference ground on the middle frame 11 through the elastic piece connection structure 30, thereby forming a signal transmission channel between the flexible printed circuit antenna or the backlight bracket and the reference ground.

The reference ground may be understood as a metal support plate in a middle region of the middle frame 11. The metal support plate may be a support plate made of an alloy material such as an aluminum alloy, a magnesium alloy, or the like, or another metal material.

The middle frame 11 may include a side frame 111 and the metal support plate. The side frame 111 is arranged around a peripheral side of the metal support plate and is connected to an edge of the metal support plate. The casing 10 of the electronic device may further include a battery, a circuit board, and the like, and the battery, the circuit board, and the like are all fixed on the metal support plate.

It should be noted that, when the first conductor 13 is a different structure in the electronic device, because the elastic piece connection structure 30 needs to conduct and ground the first conductor 13 and the second conductor 14, the elastic piece connection structure 30 may also be located in a different position of the electronic device.

Specifically, referring to FIG. 4 and FIG. 5, the casing 10 further includes a fixing member 12, and the fixing member 12 is located on the first conductor 13 and is configured to fix the first conductor 13. An edge of the fixing member 12 located in the casing 10 extends to the assembling groove 21 in a direction facing the elastic piece connection structure 30 and the insulation member 20. The elastic piece connection structure 30 may be further detachably connected to the fixing member 12 through a fastener 40 as shown in FIG. 2 and FIG. 3. In this way, under the joint action of the fastener 40 and the fixing member 12, the elastic piece connection structure 30 can be closely attached to the first conductor 13, the insulation member 20, and the second conductor 14, which enhances stability and reliability of conduction between the first conductor 13 and the second conductor 14.

Further, in order to prevent the fastener 40 from affecting a thickness of the electronic device, as shown in FIG. 2 and FIG. 3, a groove 121 may be further provided on the fixing member 12, and the fastener 40 is embedded in the groove 121, and passes through the groove 121 to detachably connect the elastic piece connection structure 30 to the insulation member 20 and the second conductor 14. In this way, detachable connection between the fixing member 12 and the fixing member 12 is implemented, and impact of arrangement of the fastener 40 on the thickness of the electronic device can be avoided.

The fastener 40 includes but is not limited to a screw, a bolt, or other connectable structures.

Exemplarily, the fixing member 12 may be an insulation decorative member such as a plastic decorative member on the casing 10, or the fixing member 12 may be an insulation fixing structure made of another insulating material. That is, the fixing member 12 includes but is not limited to the insulation decorative member.

When the fixing member 12 is the insulation decorative member, because part of the insulation decorative member is arranged on the side frame 111 of the middle frame 11, and is attached to the flexible printed circuit antenna, the insulation decorative member has a better fixing effect on the flexible printed circuit antenna. In addition, in order to facilitate detachable connection between the fixing member 12 and the elastic piece connection structure 30, the edge of the fixing member 12 located in the casing 10 may also extend toward a middle portion of the casing 10 to the elastic piece connection structure 30.

Specifically, the casing 10 may further include a back cover. The back cover, the insulation decorative member, and the middle frame 11 may constitute the casing 10 of the electronic device such as the mobile phone 100. The elastic piece connection structure 30 may be located between the middle frame 11 and the back cover. In this embodiment, the back cover may be a metal back cover, a glass back cover, a plastic back cover, or a ceramic back cover. In the embodiments of this application, a material of the back cover is not limited.

The electronic device such as the mobile phone 100 may further include a display screen, and the display screen and the back cover may be arranged on two opposite surfaces of the middle frame 11. The display screen may be configured to display information inputted by a user or information provided for a user and various menus of the electronic device, and may further accept user input. In this embodiment, the display screen may be a flat screen or a curved screen.

It may be understood that the schematic structure in the embodiments of this application constitutes no specific limitation on the mobile phone 100. In some other embodiments of this application, the mobile phone 100 may include more or fewer components than those shown in the figure, or some components may be combined, or some components may be split, or components are arranged in different manners. The components shown in the figure may be implemented by hardware, software, or a combination of software and hardware.

In order to reduce the manufacturing costs of the electronic device, the embodiments of this application provide an elastic piece connection structure 30. The elastic piece connection structure 30 is applicable to the electronic device such as the mobile phone 100, to replace the elastic piece in the existing mobile phone 100. Using the mobile phone 100 as an example below, in an application scenario where the first conductor 13 is the flexible printed circuit antenna and the second conductor 14 is the reference ground on the middle frame 11, the elastic piece connection structure 30 provided in the embodiments of this application is described in detail with reference to FIG. 2 to FIG. 12.

Figure 6:
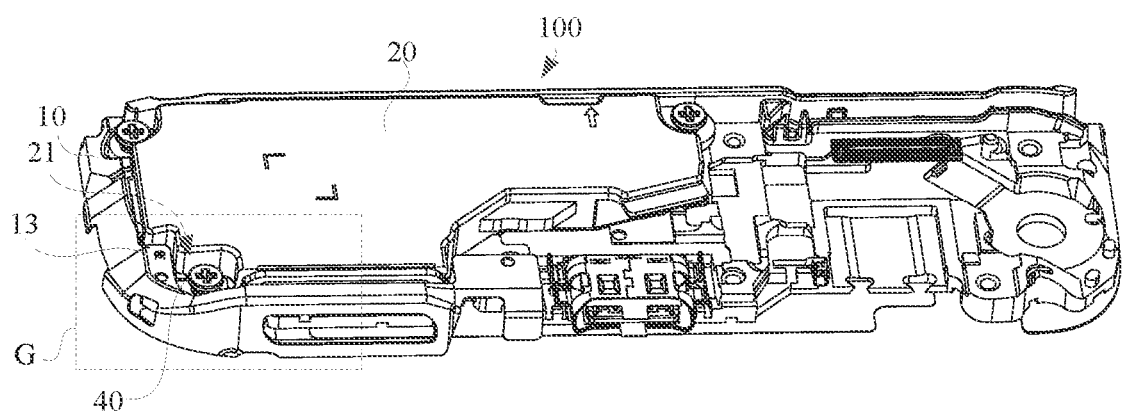
FIG. 6 is a schematic structural diagram of the mobile phone with a middle frame being removed in FIG. 1a according to an embodiment of this application.
Figure 7:
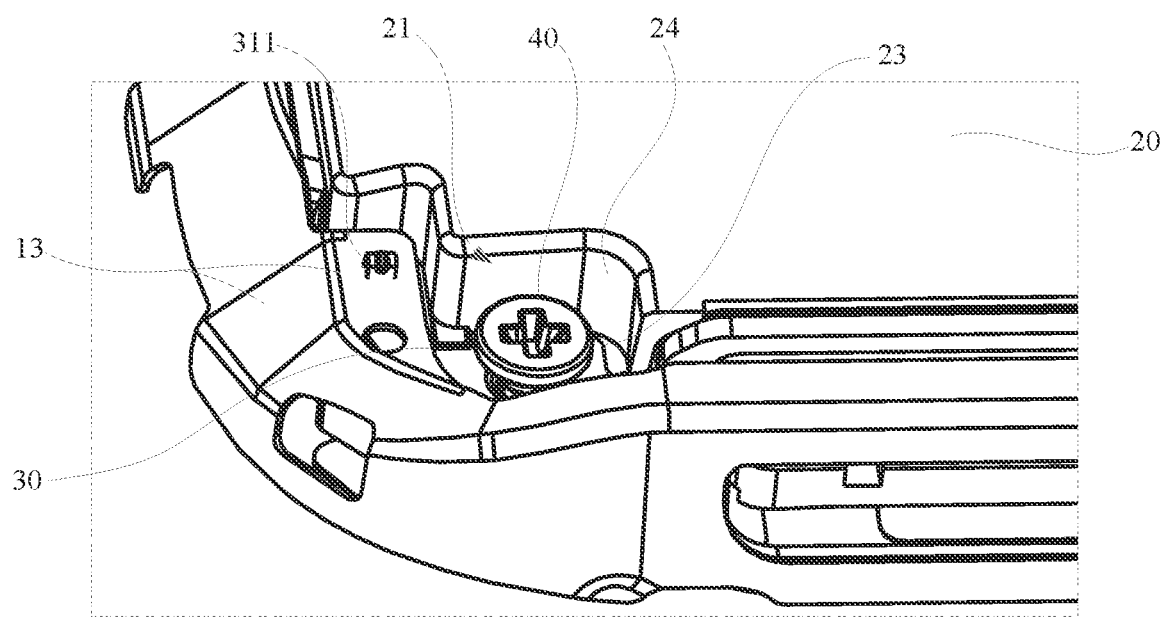
FIG. 7 is an enlarged schematic diagram of a part G of the mobile phone in FIG. 6.
Figure 8:
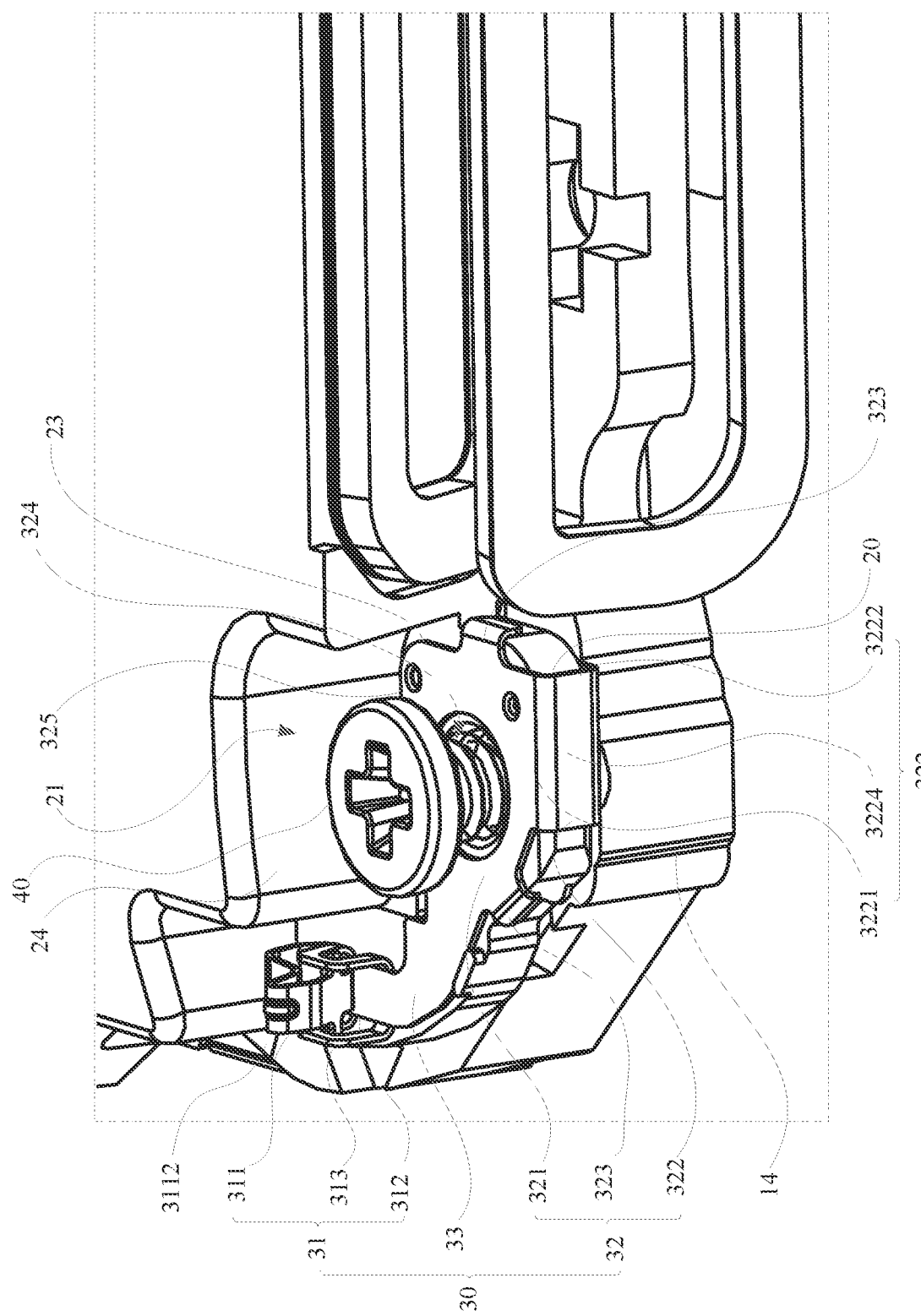
FIG. 8 is a schematic structural diagram of the mobile phone with an FPC antenna being removed in FIG. 7.

FIG. 6 is a schematic structural diagram of the mobile phone with a middle frame being removed in FIG. 1a according to an embodiment of this application. FIG. 7 is an enlarged schematic diagram of a part G of the mobile phone in FIG. 6. FIG. 8 is a schematic structural diagram of the mobile phone with an FPC antenna being removed in FIG. 7.

FIG. 2 to FIG. 8 are schematic diagrams of assembly of the elastic piece connection structure 30 in the mobile phone 100. The elastic piece connection structure 30 is applicable to the electronic device. It can be seen from FIG. 8 that, the elastic piece connection structure 30 includes a first connection end 31 and a second connection end 32 that are connected to each other and conducted with each other. The first connection end 31 includes a first contact portion 311, and the first contact portion 311 elastically abuts against and is in conduction with a first conductor 13 inside the electronic device. The second connection end 32 is detachably connected to an insulation member 20 inside the electronic device, and the second connection end 32 abuts against and is in conduction with a second conductor 14 inside the electronic device. In this way, through arrangement of the second connection end 32 on the elastic piece connection structure 30, it can be known with reference to FIG. 6 to FIG. 8 that, when the first contact portion 311 abuts against the first conductor 13, the first connection end 31 may abut against and be in conduction with the second conductor 14 inside the electronic device through the second connection end 32. In this case, the elastic piece connection structure 30 may be regarded as a connection structure between the first conductor 13 and the second conductor 14, so that the first conductor 13 and the second conductor 14 are conducted, to form a signal transmission channel between the first conductor 13 and the second conductor 14, thereby preventing the second conductor 14 from affecting performance of the first conductor 13, which improves the anti-electromagnetic interference capability of the electronic device.

In addition, compared with the existing fixing method of elastic piece soldering, in the embodiments of this application, through arrangement of the second connection end 32, based on ensuring that the first contact portion 311 abuts against and is in conduction with the first conductor 13, on one hand, the elastic piece connection structure 30 may be detachably connected to the insulation member 20 through the second connection end 32, so as to facilitate connection between the elastic piece connection structure 30 and the insulation member 20. Fixing of the elastic piece connection structure 30 in the electronic device is implemented, and a fixing method of the elastic piece connection structure 30 can be simplified, so as to reduce manufacturing costs of the electronic device by reducing fixing costs of the elastic piece connection structure 30. On the other hand, the first connection end 31 can be fixed by using the insulation member 20 inside the electronic device, the insulation member 20 may be used as a switching and fixing structure for the second connection end 32 and the elastic piece connection structure 30, and there is no need to solder the first connection end 31 and the elastic piece connection structure 30 to the casing 10, offering more positions suitable for mounting the elastic piece connection structure 30 in the electronic device.

It should be noted that, the elastic piece connection structure 30 may be located between the first conductor 13 and the insulation member 20, so that when the elastic piece connection structure 30 is detachably connected to the insulation member 20 through the second connection end 32, the elastic piece connection structure 30 may abut against and be in conduction with the first conductor 13 through the first contact portion 311.

The first conductor 13 may be the flexible printed circuit antenna as shown in FIG. 6 and FIG. 7, that is, the FPC antenna, the second conductor 14 is the reference ground on the middle frame 11, and the insulation member 20 is the speaker box. In this way, by arranging the elastic piece connection structure 30 on the speaker box, the FPC antenna may be connected to and in conduction with the reference ground on the middle frame 11, thereby grounding the FPC antenna.

Specifically, as shown in FIG. 8, a fixing base 32 is detachably connected to the insulation member 20 and the second conductor 13 through the fastener 40. In this way, the elastic piece connection structure 30 is arranged in the assembling groove 21, and the elastic piece connection structure 30 may be fixed on the insulation member 20 through the fastener 40, and abut against and be in conduction with the first conductor 13 and the second conductor 14. In addition, there is no need to fix the elastic piece connection structure 30 by soldering, which can simplify fixing of the elastic piece connection structure 30 in the electronic device, and reduce manufacturing costs of the electronic device.

In addition, the elastic piece connection structure 30 may be further tightly locked with the insulation member 20 and the second conductor 14 through the fastener 40, so that the second connection end 32 is tightly connected to the second conductor 14, which enhances stability and reliability of conduction between the first conductor 13 and the second conductor 14, to stably ground the first conductor 13 such as the FPC antenna.

In order to facilitate connection of the fastener 40, as shown in FIG. 8, a through hole 324 for the fastener 40 to pass through is provided on the second connection end 32, and the fastener 40 passes through the through hole 324 and the insulation member 20, to connect the second connection end 32 and the second conductor 14. In this way, arrangement of the through hole 324 can make it convenient for the fastener 40 to pass through the second connection end 32 and be connected to the second conductor 14, so that the second connection end 32, the insulation member 20, and the second conductor 14 may be detachably connected through the fastener 40.

The through hole 324 may be a threaded hole or another hole through which the fastener 40 can pass, and the through hole 324 may connect the second connection end 32 to the insulation member 20 and the second conductor 14. That is, the through hole 324 includes but is not limited to a screw hole that matches the fastener 40.

To make it convenient for the fastener 40 to pass through the insulation member 20, the through hole 324 for the fastener 40 to pass through is further provided on the insulation member 20 at a position opposite to the through hole 324.

It should be understood that, a connection hole (not marked in the figure) is further provided on the second conductor 14 at a position opposite to the through hole 324, so that after passing through the through hole 324 of the insulation member 20, the fastener 40 may be connected to the second conductor 14 at the connection hole. The connection hole may be a threaded through hole 324 or a threaded blind hole. In this embodiment, a structure of the connection hole is not further limited.

It should be noted that, when the fixing member 12 extends to the assembling groove 21, as shown in FIG. 2 and FIG. 3, the same fastener 40 can also pass through the groove 121 of the fixing member 12, and the fixing member 12 is connected to the second connection end 32, the insulation member 20, and the second conductor 14, so that the fixing member 12 is fixed on the second connection end 32. In this way, under the joint action of pressing of the fixing member 12 and locking of the fastener 40, degrees of abutting between the first contact portion 311 and the first conductor 13, and between the second connection end 32 and the second conductor 14 may be enhanced, and further the stability and reliability of the conduction between the first conductor 13 and the second conductor 14 are enhanced, so that the first conductor 13 is stably grounded.

A screw hole or threaded hole for the fastener 40 to pass through, or another hole that can be connected to the fastener 40 is provided in the groove 121 on the fixing member 12. In this way, it is convenient for the fastener 40 to pass through the fixing member 12 to connect to the elastic piece connection structure 30, the insulation member 20, and the second conductor 14.

To facilitate understanding of the connection between the elastic piece connection structure 30 and the insulation member 20, the first conductor 13 in FIG. 7 such as the FPC antenna is hidden in the embodiments of this application, to form a structure shown in FIG. 8. It can be seen from FIG. 8 that, the second connection end 32 covers a partial surface of the insulation member 20, and abuts against and is in conduction with the second conductor 14. In this way, it is convenient for the second connection end 32 to abut against and be in conduction with the second conductor 14, so that the first conductor 13 may be in conduction with the second conductor 14 through the elastic piece connection structure 30, so as to ground the first conductor 13, thereby improving the anti-electromagnetic interference capability of the electronic device such as the mobile phone 100.

Specifically, as shown in FIG. 8, the second connection end 32 includes a substrate 321 and a second contact portion 322. The second contact portion 322 is located on a side of the substrate 321 facing an edge of the electronic device. The second contact portion 322 extends from an edge of the substrate 321 and covers the partial surface of the insulation member 20, and the second contact portion 322 abuts against and is in conduction with the second conductor 14. In this way, the second connection end 32 and the second conductor 14 can be conducted through the second contact portion 322, so that the first conductor 13 and the second conductor 14 are conducted. Meanwhile, the second connection end 32 is engaged with the insulation member 20 through the second contact portion 322. In this way, a position of the second connection end 32 on the insulation member 20 can be pre-fixed by engagement, so as to avoid positional deviation occurring when the second connection end 32 is further fixed on the insulation member 20, thereby facilitating further connection between the second connection end 32 and the insulation member 20, for example, connection through the fastener 40. In addition, the second connection end 32 is engaged with the insulation member 20 through the second contact portion 322, which can further make fixing between the elastic piece connection structure 30 and the insulation member 20 firmer, to further enhance the stability and reliability of the conduction between the first conductor 13 and the second conductor 14.

Referring to FIG. 8, a first end 3221 of the second contact portion 322 is connected to the substrate 321, and a second end 3222 of the second contact portion 322 extends from the edge of the substrate 321 to a side of the insulation member 20 opposite to the substrate 321. In this way, the second end 3222 of the second contact portion 322 may be located between the insulation member 20 and the second conductor 14, and abut against a side of the second conductor 14 facing the insulation member 20, so that the second connection end 32 abuts against the second conductor 14 through two opposite surfaces, to increase an abutting area between the second contact portion 322 and the second conductor 14, the connection between the second connection end 32 and the second conductor 14 is more stable and reliable, and conduction between the first conductor 13 and the second conductor 14 is more stable and reliable, thereby reliably grounding the first conductor 13 such as the FPC antenna.

Figure 9:
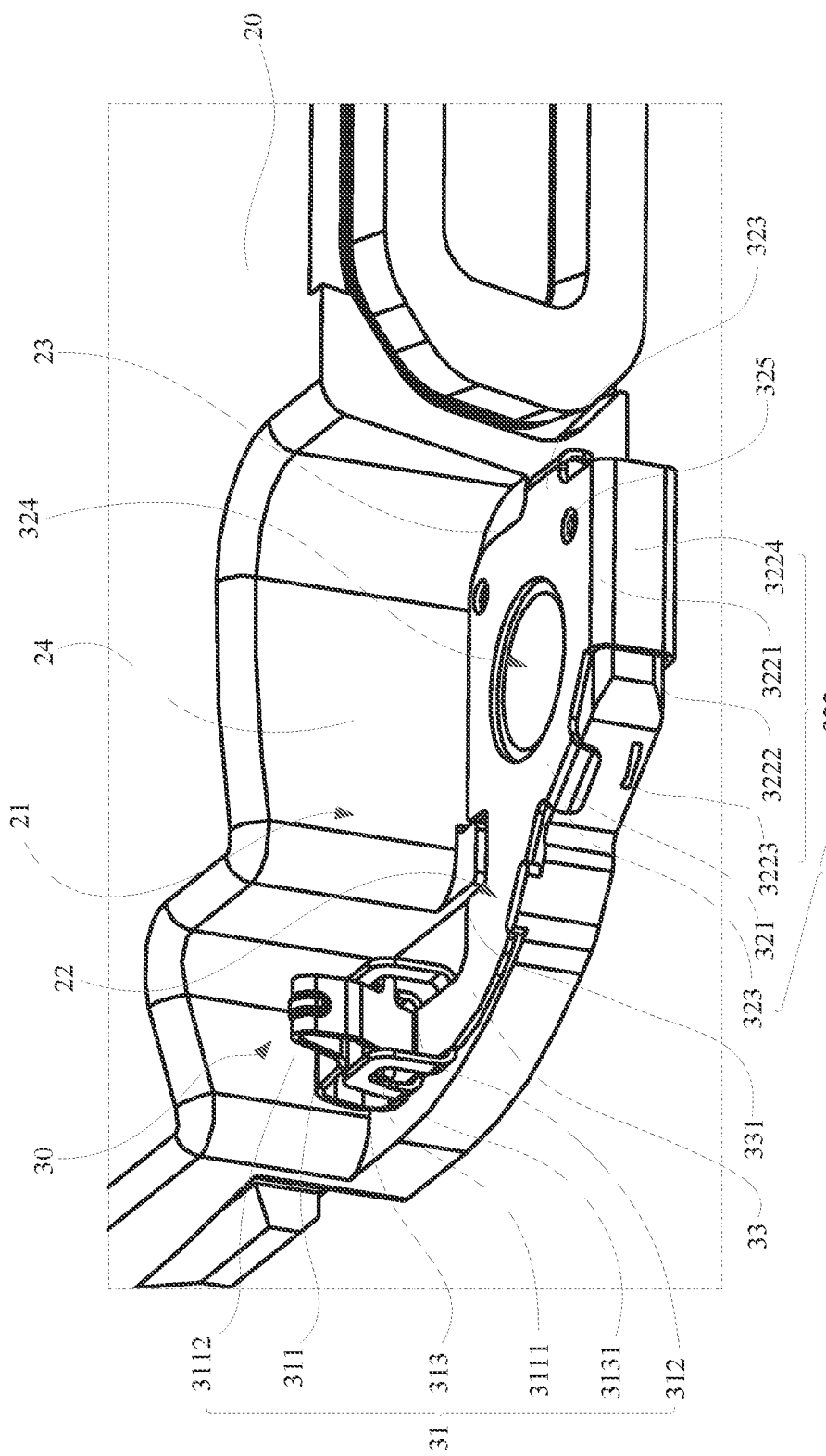
FIG. 9 is a schematic diagram of assembling an elastic piece connection structure and an insulation member in FIG. 8 according to an embodiment of this application.
Figure 10:
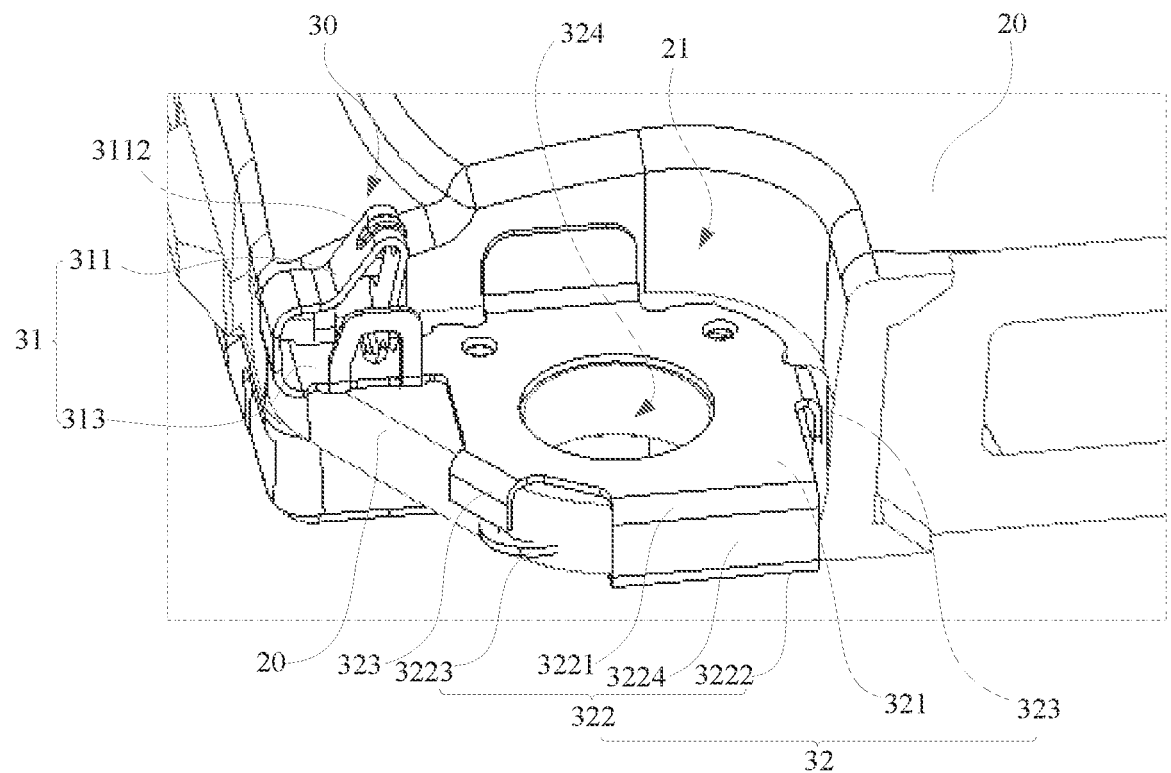
FIG. 10 is another schematic diagram of assembling an elastic piece connection structure and an insulation member in FIG. 8 according to an embodiment of this application.
Figure 11:
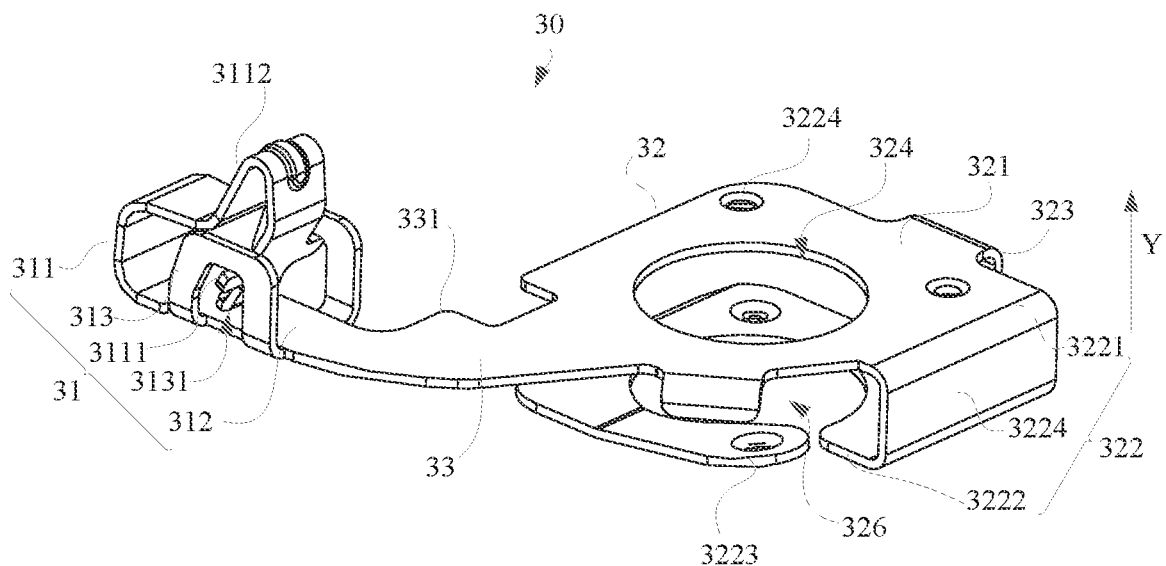
FIG. 11 is a schematic structural diagram of an elastic piece connection structure according to an embodiment of this application from a first perspective.
Figure 12:
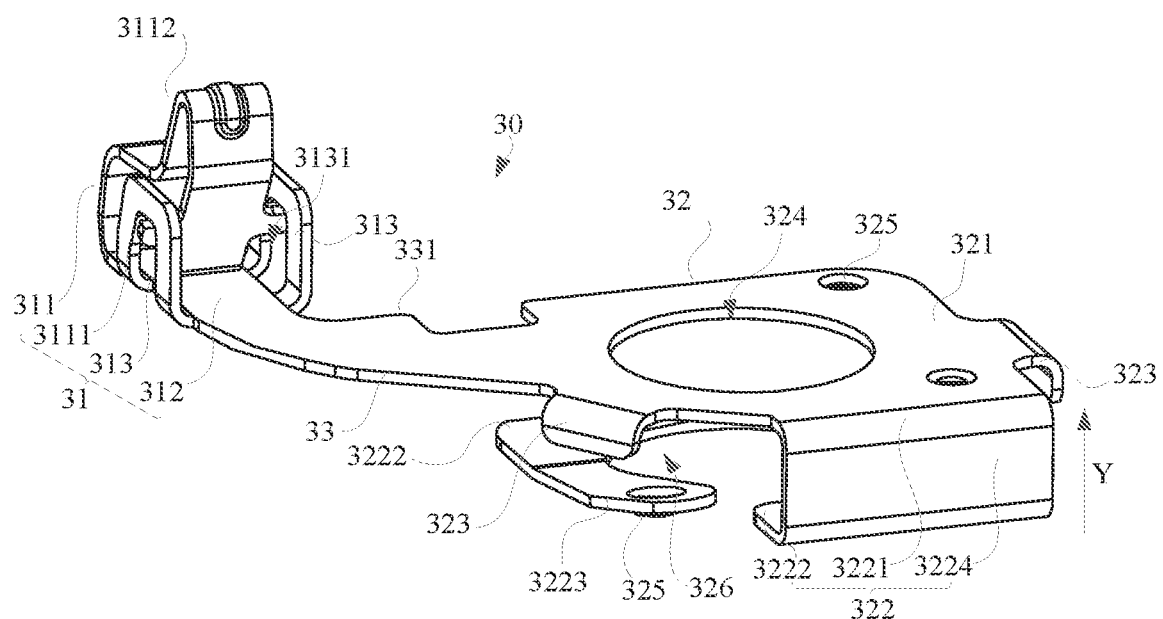
FIG. 12 is a schematic structural diagram of an elastic piece connection structure according to an embodiment of this application from a second perspective.

FIG. 9 is a schematic diagram of assembling the elastic piece connection structure and the insulation member in FIG. 8 according to an embodiment of this application. FIG. 10 is another schematic diagram of assembling the elastic piece connection structure and the insulation member in FIG. 8 according to an embodiment of this application. FIG. 11 is a schematic structural diagram of the elastic piece connection structure according to an embodiment of this application from a first perspective. FIG. 12 is a schematic structural diagram of the elastic piece connection structure according to an embodiment of this application from a second perspective.

As shown in FIG. 9 to FIG. 12, the second contact portion 322 includes a connection segment 3224, the connection segment 3224 is connected between the first end 3221 and the second end 3222, and an accommodation space 326 for accommodating the insulation member 20 is formed between the second contact portion 322 and the substrate 321. In this way, through arrangement of the accommodation space 326 in the second connection end 32, a double-layer structure as shown in FIG. 11 and FIG. 12 can be formed on the second connection end 32 in a Y direction, to arrange the insulation member 20 in the accommodation space 326, so that the second end 3222 is formed and located between the insulation member 20 and the second conductor 14, which can increase an abutting area between the second connection end 32 and the second conductor 14, and can also tightly connect the second end 3222 of the second contact portion 322 and the second conductor 14 under gravity of the insulation member 20, to further enhance the stability and reliability of the conduction between the second contact portion 322 and the second conductor 14.

In addition, through arrangement of the accommodation space 326 and the second contact portion 322 in the second connection end 32, the second end 3222 of the second contact portion 322 can further cover the insulation member 20, to implement engagement between the second connection end 32 and the insulation member 20, which makes positions of the second connection end 32 and the insulation member 20 relatively fixed, so as to facilitate further connection between the second connection end 32 and the insulation member 20.

It should be noted that, through arrangement of the connection segment 3224, a gap can be provided between the second end 3222 and the substrate 321, so as to form the accommodation space 326 between the second contact portion 322 and the substrate 321.

Exemplarily, as shown in FIG. 11 and FIG. 12, the second end 3222 of the second contact portion 322 is a plate structure parallel to the substrate 321. In this way, through arrangement of the plate structure, on one hand, the abutting area between the second end 3222 of the second contact portion 322 and the second conductor 14 can be increased, so that the second connection end 32 is tightly attached to and in conduction with the second conductor 14 through the second contact portion 322, which improves the stability and reliability of the conduction between the first conductor 13 and the second conductor 14. On the other hand, the stability of the insulation member 20 in the accommodation space 326 may be further improved, so that the insulation member 20 can be kept at the same level, to avoid a case that positional deviation of the insulation member 20 occurs in the Y direction under the action of the fastener 40 during a locking process of the fastener 40 and consequently the first contact portion 311 may be separated from the first conductor 13 to affect abutting between the first contact portion 311 and the first conductor 13, thereby ensuring the effectiveness and reliability of the conduction between the first conductor 13 and the second conductor 14.

It should be understood that the through hole 324 for the fastener 40 to pass through is provided on the second end 3222 of the second contact portion 322, so that the fastener 40 can pass through the second end 3222 of the second contact portion 322, to tightly connect the second connection end 32 to the insulation member 20 and the second conductor 14.

In an optional implementation, as shown in FIG. 11 and FIG. 12, the second contact portion 322 includes an insertion segment 3223 inserted in the insulation member 20, the insertion segment 3223 is arranged close to an edge of the electronic device and extends from an edge of the second end 3222, and the insertion segment 3223 is inserted on a surface of the insulation member 20 (as shown in FIG. 9 and FIG. 10). In this way, based on that the second connection end 32 is engaged with the insulation member 20 and is connected to the fastener 40, a fixing effect of the second connection end 32 on the insulation member 20 may be enhanced by inserting the insertion segment 3223 into the insulation member 20, to further avoid relative movement between the second connection end 32 and the insulation member 20, so as to implement firm connection between the elastic piece connection structure 30 and the insulation member 20, to further enhance the stability and reliability of the conduction between the first conductor 13 and the second conductor 14, thereby reliably grounding the first conductor 13 such as a PC antenna.

To make it convenient for the insertion segment 3223 to be inserted into the insulation member 20, an insertion hole (not marked in the figure) may be further provided on the assembling platform 23 of the insulation member 20. The insertion hole may be exposed on a surface of the assembling platform 23, and the insertion segment 3223 may be inserted into the insulation member 20 through the insertion hole and be exposed on the surface of the insulation member 20.

It should be understood that, the second end 3222 of the second contact portion 322 is located on a side of the insulation member 20 opposite to the substrate 321, that is, the second end 3222 is located on a side of the insulation member 20 facing the substrate 321. To insert the insertion segment 3223 into the assembling platform 23, the insertion segment 3223 should be a folded edge on the second end 3222 of the second contact portion 322 facing the substrate 321. In this way, when the insertion segment 3223 is inserted into the insulation member 20, abutting and conduction between the second contact portion 322 and the second conductor 14 are not affected.

In a possible implementation, as shown in FIG. 11 and FIG. 12, the second end 3222 of the second contact portion 322 may partially extend along the edge of the substrate 321 to the side of the insulation member 20 opposite to the substrate 321. In this way, by adjusting and changing an extending direction of the second end 3222 for a plurality of times, the through hole 324 is formed in the second end 3222, and the insertion segment 3223 is formed at an end of the second end 3222.

Alternatively, in another possible implementation, the second end 3222 of the second contact portion 322 may also entirely extend along the edge of the substrate 321 to the side of the insulation member 20 opposite to the substrate 321. Then, the through hole 324 is formed in the second end 3222, and the insertion segment 3223 is formed by machining or the like. In this embodiment, an extension manner of the second end 3222 of the second contact portion 322, and a forming manner of the through hole 324 and the insertion segment 3223 are not further limited.

To further enhance an engagement effect between the second connection end 32 and the insulation member 20, as shown in FIG. 11 and FIG. 12, an engaging portion 323 is further arranged on the edge of the substrate 321, and the engaging portion 323 is engaged with the edge of the insulation member 20 (as shown in FIG. 9 and FIG. 10). In this way, under the joint action of the second contact portion 322 and the engaging portion 323, movement of the second connection end 32 relative to the insulation member 20 may be restricted, so as to prevent the second connection end 32 from moving relative to the insulation member 20 when being further connected to the insulation member 20, thereby enhancing the engagement effect between the second connection end 32 and the insulation member 20, which can facilitate further connection and fixing between the second connection end 32 and the insulation member 20, and can also ensure the stability and reliability of the conduction between the first conductor 13 and the second conductor 14, to stably ground the first conductor 13 such as the FPC antenna.

At least two engaging portions 323 are further arranged on the edge of the substrate 321, and the engaging portions 323 are located on a peripheral side of the substrate 321. In this way, movement of the second connection end 32 relative to the insulation member 20 can be limited by the engaging portions 323, so as to prevent the second connection end 32 from moving relative to the insulation member 20 during a process of being connected by the fastener 40. A further connection between the second connection end 32 and the insulation member 20 through the fastener 40 is facilitated, and the stability and reliability of the conduction between the first conductor 13 and the second conductor 14 can be ensured.

In a possible implementation, the engaging portions 323 may be distributed on two sides of the second contact portion 322. In this way, it is ensured that the engaging portion 323 is engaged with the insulation member 20, and arrangement of the elastic piece connection structure 30 on the insulation member 20 can be facilitated.

Alternatively, the engaging portion 323 may be distributed on a side of the substrate 321 opposite to the second contact portion 322. In this embodiment, an arrangement position of the engaging portion 323 on the substrate 321 is not further limited.

Exemplarily, the engaging portion 323 may be a folded edge on the edge of the substrate 321 that is bent toward the insulation member 20. In this way, not only engagement between the second connection end 32 and the insulation member 20 can be facilitated, but also structures of the second connection end 32 and the elastic piece connection structure 30 can be simplified, which further reduces the manufacturing costs of the electronic device.

Further, as shown in FIG. 11 and FIG. 12, a limiting bump 325 is provided on each of the substrate 321 and a surface of the second end 3222 of the second contact portion 322 facing the second conductor 14. Correspondingly, a concave portion (not marked in the figure) matching the limiting bump 325 is provided on the insulation member 20. When the second connection end 32 is assembled on the insulation member 20, the limiting bump 325 is located in the concave portion, which can further enhance the stability of the connection between the second connection end 32 and each of the insulation member 20 and the second conductor 14, and can further avoid movement of the second connection end 32 relative to the insulation member 20.

In a possible implementation, referring to FIG. 11 and FIG. 12, the elastic piece connection structure 30 may further include a connection portion 33, and the first connection end 31 is connected to the second connection end 32 through the connection portion 33. In this way, by adjusting a length and a structure of the connection portion 33, or adding the connection portion 33 between the first connection end 31 and the second connection end 32, a position of the first contact portion 311 on the elastic piece connection structure 30 may be adjusted as shown in FIG. 9 and FIG. 10, so that a degree of freedom of a settable position of the first contact portion 311 on the elastic piece connection structure 30 is higher, the first contact portion 311 can abut against and be in conduction with the first conductor 13 at different positions in the electronic device such as the mobile phone 100, and the elastic piece connection structure 30 can be applied in more scenarios in the electronic device and have wider applicability.

The connection portion 33 may be a connecting arm. Exemplarily, the connecting arm may be a connecting plate or a connecting rod. An end of the connecting arm may be connected to a connection base 312 of the first connection end 31, and an other end may be connected to the substrate 321 of the second connection end 32. In this way, the connection between the first connection end 31 and the second connection end 32 is ensured, and the structure of the elastic piece connection structure 30 can be simplified.

To fix the elastic piece connection structure 30 in the assembling groove 21, in a possible implementation, a slot 22 may be further provided in the assembling groove 21 of the insulation member 20. When the elastic piece connection structure 30 is arranged in the assembling groove 21, as shown in FIG. 9, the elastic piece connection structure 30 may be engaged with the slot 22 through an engaging block 331 on the connection portion 33. In this way, the position of the elastic piece connection structure 30 in the assembling groove 21 may be limited, so as to further avoid relative displacement between the second connection end 32 and the insulation member 20, thereby facilitating further connection and fixing between the elastic piece connection structure 30 and the insulation member 20.

The engaging block 331 may be formed by a protruding portion extending from the connection portion 33, or may be formed by arranging a groove on the connection portion 33. In this embodiment, the structure and the forming method of the engaging block 331 are not further limited.

Alternatively, other limiting structures such as a limiting protrusion may be provided in the assembling groove 21. Correspondingly, a limiting groove or the like which matches the limiting protrusion is provided on the elastic piece connection structure 30.

As shown in FIG. 11 and FIG. 12, the first contact portion 311 is an elastic arm or an elastic protrusion. In this way, it is ensured that the first contact portion 311 elastically abuts against and is in conduction with the first conductor 13, and a structure of the first contact portion 311 can be more diversified.

In order to facilitate elastic abutting and conduction between the first contact portion 311 and the first conductor 13, an elastic contact 3112 is further arranged on the first contact portion 311, so that the first contact portion 311 can abut against and be in conduction with the first conductor 13 through the elastic contact 3112.

The first connection end 31 includes the connection base 312 and the first contact portion 311 arranged on the connection base 312, an end of the first contact portion 311 is connected to the connection base 312, and there is a gap between an other end of the first contact portion 311 and the connection base 312. In this way, the first contact portion 311 can have certain elasticity, so that under an external force, the first contact portion 311 may abut against the first conductor 13 such as the FPC antenna, and when the external force is removed, the first contact portion 311 may be automatically reset.

In order to prevent the first contact portion 311 from being deviated relative to the connection base 312 under the external force, as shown in FIG. 11 and FIG. 12, two limiting portions 313 arranged opposite to each other are further arranged on the first connection end 31, and the first contact portion 311 is located between the two limiting portions 313. In this way, the first contact portion 311 may be limited by the limiting portions 313, to avoid excessive positional deviation occurring when the first contact portion 311 moves relative to the first connection end 31 under an external force. In addition, the limiting portion 313 may further play a certain guiding role in the movement of the first contact portion 311 relative to the first connection end 31.

Specifically, a limiting block 3111 protruding toward the limiting portion 313 is further arranged on an edge of the first contact portion 311, and the limiting block 3111 is located in the limiting portion 313 and in a groove body 3131 of the limiting portion 313. In this way, when the first contact portion 311 moves relative to the connection base 312, the limiting block 3111 may be limited in the limiting portion 313, thereby limiting and guiding the first contact portion 311.

It should be understood that, in order to facilitate the conduction between the first conductor 13 and the second conductor 14, the elastic piece connection structure 30 may be made of a conductor material. Exemplarily, the conductor material includes but is not limited to a metal material such as an aluminum alloy, a magnesium alloy, stainless steel, or the like.

In a possible implementation, the first connection end 31, the connection portion 33, and the second connection end 32 may be made of one or more conductor materials through an integral molding process, so that the elastic piece connection structure 30 has higher structural strength.

Alternatively, in another possible implementation, the first connection end 31, the connection portion 33, and the second connection end 32 may be mutually independent structures, and are connected to each other through a process such as soldering. In this embodiment, a forming method of the elastic piece connection structure 30 is not further limited.

It should be noted that, in addition to conducting the first conductor 13 and the second conductor 14, the elastic piece connection structure 30 in the embodiments of this application can further use a first connection end 31 of a different structure to connect any object that needs to be conducted in the electronic device.

According to the embodiments of this application, by arranging the second connection end 32 on the elastic piece connection structure 30, based on achieving the conduction between the first conductor 13 and the second conductor 14, detachable connection between the elastic piece connection structure 30 and the insulation member 20 can be facilitated, fixing of the elastic piece connection structure 30 in the electronic device is implemented, and the manufacturing costs of the electronic device are reduced. In addition, the first connection end 31 can be fixed using the insulation member 20 inside the electronic device, offering more positions suitable for mounting the elastic piece connection structure 30 in the electronic device.

In the description of the embodiments of this application, it is to be noted that, unless specified or limited otherwise, the terms "mount", "connect", and "connection" should be understood broadly, for example, which may be fixed connection, indirectly connected to each other through an intermediate medium, or communication inside two elements or an interaction relationship between two elements. A person of ordinary skill in the art may understand the specific meanings of the foregoing terms in the embodiments of this application according to specific situations.

The terms such as "first", "second", "third", and "fourth" (if any) in the specification and claims of the embodiments of this application and in the accompanying drawings are used for distinguishing between similar objects and not necessarily used for describing any particular order or sequence.

What is claimed is:

1. An elastic piece connection structure detachably mounted within an interior space of a casing of a mobile device, wherein the elastic piece connection structure comprising:
   a first connection end comprising a first contact portion, wherein the first contact portion elastically abuts against and is in conduction with a first conductor inside the mobile device; and
   a second connection end connected to the first connection end, wherein the second connection end is detachably connected to an insulation member inside the mobile device, and the second connection end abuts against and is in conduction with a second conductor inside the mobile device, wherein at least one of the first conductor or the second conductor is integrally formed with or fixedly attached to the casing of the mobile device, wherein the second connection end covers a partial surface of the insulation member, and abuts against and is in conduction with the second conductor, and wherein the second connection end comprises a substrate and a second contact portion; wherein the second contact portion extends from an edge of the substrate and covers the partial surface of the insulation member, the second contact portion abuts against and is in conduction with the second conductor, and the second connection end is engaged with the insulation member through the second contact portion.

2. The elastic piece connection structure of claim 1, wherein the second connection end is detachably connected to the insulation member and the second conductor through a fastener.

3. The elastic piece connection structure of claim 2, wherein a through hole for the fastener to pass through is provided on the second connection end, and wherein the fastener passes through the through hole and the insulation member to connect the second connection end and the second conductor.

4. The elastic piece connection structure of claim 1, wherein a first end of the second contact portion is connected to the substrate, and wherein a second end of the second contact portion extends from the edge of the substrate to a side of the insulation member opposite to the substrate.

5. The elastic piece connection structure of claim 4, wherein the second contact portion comprises a connection segment; wherein the connection segment is connected between the first end and the second end, and an accommodation space for accommodating the insulation member is formed between the second contact portion and the substrate.

6. The elastic piece connection structure of claim 5, wherein the second end of the second contact portion is a plate structure parallel to the substrate.

7. The elastic piece connection structure of claim 6, wherein the second contact portion comprises an insertion segment inserted into the insulation member; wherein the insertion segment extends from an edge of the second end, and the insertion segment is inserted on the insulation member.

8. The elastic piece connection structure of claim 1, wherein an engaging portion is arranged on the edge of the substrate, and the engaging portion is engaged with an edge of the insulation member.

9. The elastic piece connection structure of claim 8, wherein at least two engaging portions are further arranged on the edge of the substrate, and the engaging portions are located on a peripheral side of the substrate.

10. The elastic piece connection structure of claim 9, wherein the engaging portions are distributed on two sides of the second contact portion.

11. The elastic piece connection structure of claim 8, wherein the engaging portion is a folded edge on the edge of the substrate that is bent toward the insulation member.

12. The elastic piece connection structure of claim 1, further comprising: a connection portion; wherein the first connection end is connected to the second connection end through the connection portion.

13. The elastic piece connection structure of claim 1, wherein the first contact portion is an elastic arm or an elastic protrusion.

14. The elastic piece connection structure of claim 13, wherein the first connection end further comprises two limiting portions arranged opposite to each other, and wherein the first contact portion is located between the two limiting portions.

15. A mobile device, comprising:
a casing;
a first conductor;
a second conductor;
an insulation member arranged in the casing; and
an elastic piece connection structure detachably mounted within an interior space of the casing;
wherein the elastic piece connection structure, comprising:
a first connection end comprising a first contact portion, wherein the first contact portion elastically abuts against and is in conduction with a first conductor inside the mobile device; and
a second connection end connected to the first connection end, wherein the second connection end is detachably connected to an insulation member inside the mobile device, and the second connection end abuts against and is in conduction with a second conductor inside the mobile device, wherein at least one of the first conductor or the second conductor is integrally formed with or fixedly attached to the casing of the mobile device, wherein the second connection end covers a partial surface of the insulation member, and abuts against and is in conduction with the second conductor, and wherein the second connection end comprises a substrate and a second contact portion; wherein the second contact portion extends from an edge of the substrate and covers the partial surface of the insulation member, the second contact portion abuts against and is in conduction with the second conductor, and the second connection end is engaged with the insulation member through the second contact portion;
wherein the elastic piece connection structure is detachably connected to the second conductor through the insulation member, at least one of the first conductor and the second conductor is arranged on the casing, and the first conductor abuts against and is in conduction with the second conductor through the elastic piece connection structure.

16. The mobile device of claim 15, wherein an assembling groove is arranged on the insulation member, and the elastic piece connection structure is arranged in the assembling groove.

17. The mobile device of claim 15, wherein the first conductor is one of a flexible printed circuit antenna and a backlight bracket of a display screen, and the second conductor is a reference ground on a middle frame of the casing.

18. The mobile device of claim 17, wherein the insulation member is a speaker box in the casing.

* * * * *